US008580065B2

(12) United States Patent
Huttunen et al.

(10) Patent No.: US 8,580,065 B2
(45) Date of Patent: Nov. 12, 2013

(54) METHOD FOR CREATING A DIFFRACTIVE OPTICAL EFFECT ON A TARGET SURFACE AND A TRANSFER FOIL OF A DIFFRACTIVE OPTICAL ELEMENT

(75) Inventors: Olli-Heikki Huttunen, Oulu (FI); Johanna Hiitola-Keinänen, Oulu (FI)

(73) Assignee: Valtion teknillinen tutkimuskeskus, VTT (FI)

( * ) Notice: Subject to any disclaimer, the term of this patent is extended or adjusted under 35 U.S.C. 154(b) by 0 days.

(21) Appl. No.: 13/376,323

(22) PCT Filed: May 31, 2010

(86) PCT No.: PCT/EP2010/057541
§ 371 (c)(1), (2), (4) Date: Feb. 14, 2012

(87) PCT Pub. No.: WO2010/139661
PCT Pub. Date: Dec. 9, 2010

(65) Prior Publication Data

US 2012/0132351 A1 May 31, 2012

(30) Foreign Application Priority Data

Jun. 3, 2009 (EP) ..................................... 09161774

(51) Int. Cl.
*B32B 38/06* (2006.01)
*B32B 38/10* (2006.01)
*B32B 3/30* (2006.01)

(52) U.S. Cl.
USPC .......................................... 156/245; 156/247

(58) Field of Classification Search
USPC .......................................................... 156/245
See application file for complete search history.

(56) References Cited

U.S. PATENT DOCUMENTS 5,300,169 A * 4/1994 Tahara .......................... 156/230
5,744,219 A * 4/1998 Tahara ....................... 428/32.79
(Continued)

FOREIGN PATENT DOCUMENTS

DE 102007013284 9/2008
GB 468942 * 7/1937
GB 2220386 1/1990

OTHER PUBLICATIONS

International search report dated Sep. 27, 2010 in corresponding PCT/EP2010/057541.

(Continued)

*Primary Examiner* — Philip Tucker
*Assistant Examiner* — Vicki Wu
(74) *Attorney, Agent, or Firm* — Young & Thompson

(57) ABSTRACT

Method of creating a copied fine structure producing a diffractive optical effect onto the target surface, includes using a transfer foil manufactured from thermoplastic, on the surface of which is first created an original fine structure producing a diffractive optical effect; placing the transfer foil on the target surface with the original fine structure is in contact with the target surface; heating the transfer foil to a temperature close to the glass transition temperature of the material of the transfer foil; simultaneously during the heating or immediately after the heating lightly pressing the transfer foil against the target surface, whereby material from the transfer foil adheres to the target surface; and removing the transfer foil from the target surface, whereby the adhered material makes up a copied fine structure, which is a mirror image of the original fine structure of the transfer foil.

20 Claims, 2 Drawing Sheets

(56) References Cited

U.S. PATENT DOCUMENTS

Figure 1A:
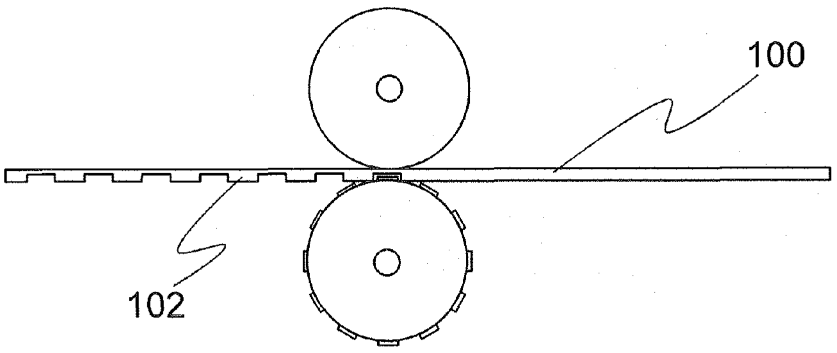

| | | | | |
|---|---|---|---|---|
| 6,909,444 | B2 * | 6/2005 | Ishida et al. | 347/187 |
| 2004/0144479 | A1 * | 7/2004 | Cueli | 156/230 |
| 2004/0234816 | A1 * | 11/2004 | Azakami et al. | 428/694 B |

OTHER PUBLICATIONS

European search report dated Dec. 4, 2009 in corresponding EP 09161774.6.

* cited by examiner

METHOD FOR CREATING A DIFFRACTIVE OPTICAL EFFECT ON A TARGET SURFACE AND A TRANSFER FOIL OF A DIFFRACTIVE OPTICAL ELEMENT

The invention relates to a method for creating a copied fine structure, which produces a diffractive optical effect, on a target surface. The invention also relates to a transfer foil used in the method.

By diffractive optical effect (DOE) is meant a fine structure created on the surface of an object, which fine structure has characteristics, which affect the travelling of light beams. With the aid of diffractive optical elements the appearance of products and packagings can be altered and the product can be made to look different from different viewing angles. With the aid of optical elements, information, which can be read by sight or with the aid of various optical devices, and various optical identifiers, such as holograms, can be added to the products and their packagings.

Three different basic techniques are used in manufacturing diffractive optical elements. Hot embossing uses a metallic mould, typically a mould made of nickel, with which a fine structure is pressed into the surface of the heated polymer foil. Hot embossing can be realized in an economical and quick manner with a printing machine using a roll-to-roll method. Typical commercial products manufactured with this method are diffractive product wrappings and the safety holograms of credit cards and banknotes. The hot embossing technique can in an industrial process be used to manufacture optical elements, the line width of which is less than 100 nanometres. Other methods of manufacturing diffractive optical elements are injection moulding technique, where the optical microstructure is manufactured by injecting molten polymer under pressure into a mould made of steel or nickel, and UV embossing, where liquid monomer or polymer placed in a mould is hardened with the aid of ultraviolet light.

Although the industrial manufacturing of diffractive optical elements is comparatively simple, their manufacturing still requires expensive machines and production devices. A small-scale manufacturing of diffractive optical elements is thus very expensive.

The manufacturing of diffractive optical foils is easy with the aid of printing machines. Other than foil-like optical elements can however not be manufactured with printing machines. If it is desired to create a diffractive optical element on the surface of a three-dimensional object, the clearly more expensive injection moulding technique must be used.

A disadvantage of using diffractive optical elements is further that they always require an industrial manufacturing apparatus. The enlivenment of the surface of individual products or objects at home with the aid of diffractive optical elements is thus impossible.

The aim of the invention is to provide a method for creating a diffractive optical element on a target surface and a transfer foil of a diffractive optical element, with which the disadvantages and flaws related to prior art can be significantly reduced.

The aims of the invention are obtained with a method and a transfer foil, which are characterized in what is presented in the independent claims. Some advantageous embodiments of the invention are presented in the dependent claims.

In the method according to the invention a fine structure, which produces a diffractive optical effect, is created on the target surface. A transfer foil is used in the method, on the surface of which there is an original fine structure, which produces a diffractive optical effect. The transfer foil is of some material in the form of a flexible foil, which is suitable for the purpose, such as thermoplastic plastic. The original fine structure of the transfer foil can have been created with some suitable method, such as electron beam lithography, chemical or plasma etching or various printing techniques, such as gravure printing, flexographic or offset printing technique or screen printing. The original fine structure is preferably created on the surface of the transfer foil with hot embossing, by working with laser or with hololithography. The transfer foil used in the method can be manufactured as a part of the manufacturing process of the fine structure of the target surface or a transfer foil manufactured earlier or acquired from elsewhere, which has the desired original fine structure, can be used in the method. The target surface can in principle be any surface of an object, such as a painted or lacquered wooden surface, a plastic surface or a coated paper surface, which has a sufficiently good adhesion with the material of the transfer foil. The target surface can be evenly shaped or it can be curved.

The selected transfer foil is placed on the target surface so that its original fine structure is in contact with the target surface. Thereafter the transfer foil is heated to a temperature which is close to the glass transition temperature of the material of the transfer foil, but lower than its melting temperature. During the heating, material from the transfer foil adheres to the target surface. The transfer foil can be pressed against the target surface during the heating or immediately thereafter. Finally the transfer foil is removed from the surface of the object. The material from the transfer foil, which has adhered to the target surface, creates a copied fine structure, which is a mirror image of the original fine structure of the transfer foil.

The height of the copied fine structure created on the target surface is in the direction of the normal of the target surface preferably somewhat smaller than the height of the original fine structure, i.e. 100-200 nm, preferably 100-150 nm. The dimensions of the copied fine structure are, however, such that it produces a diffractive optical effect, when it interacts with light.

In an advantageous embodiment of the method according to the invention the material of the transfer foil is cellulose acetate. In order to get the material of the transfer foil to a state, where it adheres to the target surface, it is heated to a temperature of 100-130° C.

In another advantageous embodiment of the method according to the invention, a substance which improves adhesion, i.e. a primer, is dispensed onto the target surface before the transfer foil is put in place. The substance which improves adhesion can for example be some suitable commercially available primer, which is meant for printing products. With the aid of the substance which improves adhesion the adhesion between the transfer foil and the target surface can be improved, which enables the creation of a copied fine structure also on surfaces, which have a weak adhesion, such as glass surfaces.

Fine structures, which produce a diffractive optical effect, can be manufactured with the method according to the invention for different purposes, such as a copied fine structure, which produces a decorative optical effect, or a copied fine structure, which functions as a coupling grating for a light beam.

An advantage of the invention is that it enables the creating of diffractive optical elements onto three-dimensional objects and curved surfaces of objects in a simple and economical manner. The invention also provides a possibility to create diffractive optical elements on such objects and surfaces, where the creating of optical elements has previously been very expensive or even impossible.

It is a further advantage of the invention that it enables the creating of diffractive optical elements onto surfaces of objects with the aid of means available in households without special skill. The invention thus remarkably increases the use possibilities of optical elements for example in decorative applications.

It is an advantage of the transfer foil of diffractive optical elements according to the invention that it is easy to manufacture with the aid of devices in use today.

In the following, the invention will be described in detail. In the description, reference is made to the appended drawings, in which FIGS. 1*a*-1*d* show in an exemplary manner a method according to the invention with the aid of a series of figures and FIG. 2 shows the method according to the invention with the aid of a simple flow chart.

The series of FIGS. 1*a*-1*d* shows in an exemplary manner the different steps of a method according to the invention with the aid of a series of figures. FIG. 2 shows the method according to the invention with the aid of a simple flow chart. The method makes use of a transfer foil 100, onto the surface of which has been created a fine structure, which achieves an optical effect, using some suitable method (FIG. 1*a*). By a fine structure which achieves an optical effect is here meant a pattern, a so-called diffractive grating, created in the surface of the transfer foil with the aid of grooves, in which pattern the widths and depths of the grooves are in the order of 100-1000 nanometres, preferably 300-1000 nanometres, and the distances between adjacent patterns, the so-called grating periods, are in the order of 400-3000 nanometres, preferably 800-1500 nanometres. The interaction of such a fine structure of the surface with the light that hits it leads to many optical phenomena, among others light dispersion and diffraction. A visible optical effect is generated from the effect of these phenomena, which optical effect usually varies depending on the viewing direction. The fine structure created on the surface of the transfer foil is in this presentation called the original fine structure 102.

Many different methods are known for manufacturing the original fine structure, such as electron beam lithography, chemical or plasma etching or various printing techniques, such as gravure printing, flexographic or offset printing technique. The original fine structure of the transfer foil used in the method is preferably manufactured by working with laser, by hololithography or by hot embossing with the aid of a nickel mould. The hot embossing can be done with a roll printing machine using the roll-to-roll method or by embossing in a static manner. The creating of a fine structure, which produces a diffractive optical effect, on the surface of the polymer foil is as such prior art, so it is not discussed in further detail in this context.

The material of the transfer foil 100 of the diffractive optical element is some thermoplastic plastic foil, which is moulded under the influence of heat and pressure, i.e. thermoplastic foil. Many different thermoplastic foils can be used in the method according to the invention. Characteristics required from the used plastic foil are among others a sufficiently low glass transition temperature and a good adhesion to different materials. The thickness of the transfer foil is selected according to the used material. Preferably the thickness of the transfer foil is 15-200 μm.

Figure 1B:
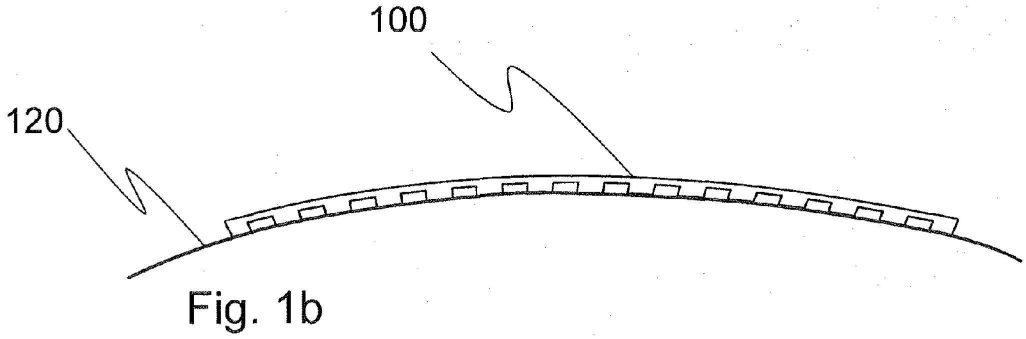
Figure 2:
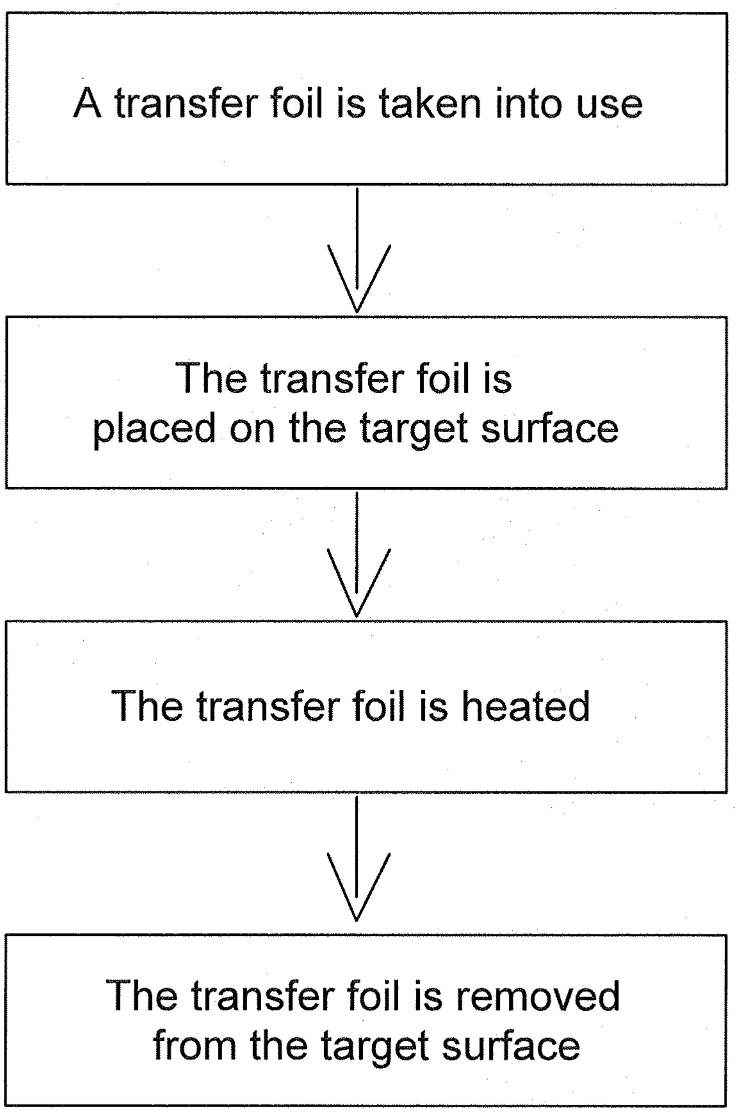

After the manufacturing of the transfer foil the transfer foil is placed onto the target surface 120 so that the original fine structure 102 settles against the target surface (FIG. 1*b*). The shape of the target surface can be an even or curved surface of a three-dimensional object or film. The transfer foil can be attached immovably to the target surface, for example using tape.

Figure 1C:
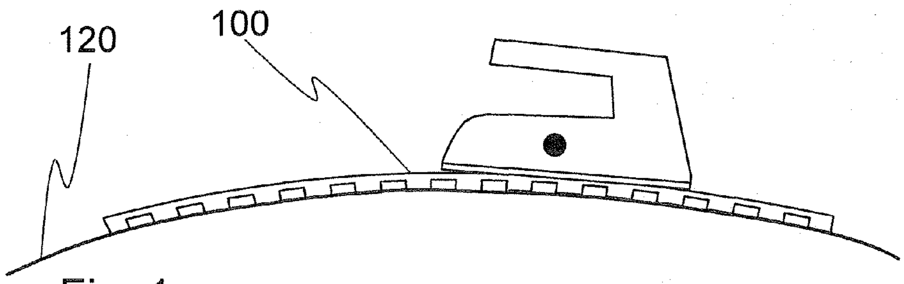
Figure 1D:
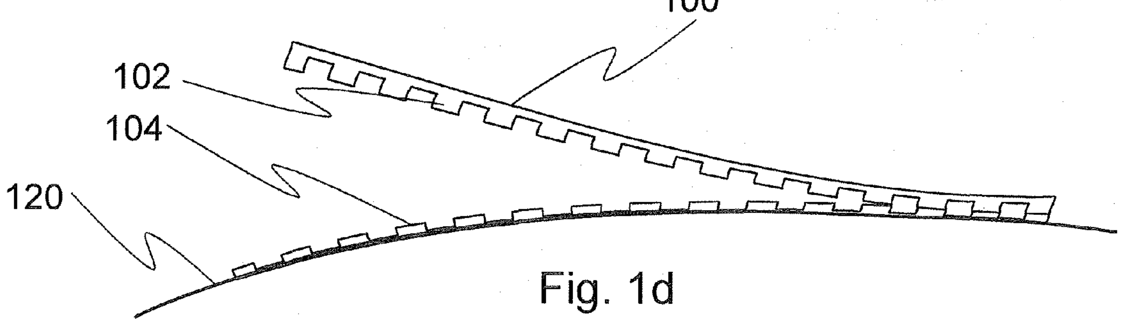

Next the transfer foil is heated to such a temperature that the material of the transfer foil softens sufficiently and at the same time the transfer foil can be pressed lightly against the surface of the object (FIG. 1*c*). Through the interaction of the heat and the contact between the transfer foil and the target surface a part of the material of the original fine structure 102 of the transfer foil adheres to the target surface 120. After a short heating the transfer foil is removed from the surface of the object, whereby the original fine structure of the transfer foil has been copied as a mirror image onto the surface of the target object (FIG. 1*d*). By copying of the pattern is meant that a copied fine structure 104, which is substantially identical to the original fine structure, is created on the surface of the target object. Naturally the depth of the grooves in the copied fine structure created on the surface of the target object is not as great as in the original fine structure, i.e. the dimensions of the copied fine structure in the direction of the normal of the surface are smaller than in the original fine structure. The dimensions of the copied fine structure created on the target surface are however such that it functions in interaction with light to produce a diffractive optical effect.

The heating of the transfer foil can be done with simple means used in households, such as an iron, a hairdryer or a hot-air blower. The heating can also be done in an oven by placing the object, to the target surface of which the transfer foil is attached, in the oven at a suitable temperature for the time needed to heat up the transfer foil.

The suitable temperature and heating time of the transfer foil depends on the material of the transfer foil. For the fine structure on the surface of the transfer foil to be able to be copied onto the target surface, the temperature of the transfer foil needs to be raised close to the so-called glass transition temperature. The height of the glass transition temperature depends on the material of the transfer foil. Close to the glass transition temperature the thermal energy makes possible the movement of the molecules in the transfer foil and the adhesion of the molecules to the surface of the target object. The temperature can however not be raised up to the melting temperature of the material, in order for the original fine structure of the transfer foil not to be completely destroyed.

In an advantageous embodiment of the method according to the invention a transfer foil is used, the material of which is cellulose acetate. By using cellulose acetate the original fine structure of the transfer foil can be copied onto target surfaces, which have a sufficient smoothness and a sufficiently good adhesion. Many widely used materials have these properties, for example most thermoplastics, coated paper and paperboard and painted and lacquered wood. When using cellulose acetate the transfer foil is heated to about 125° C. for example with an iron and the transfer foil is pressed onto the target surface. Another alternative is to first attach the transfer foil to the target surface for example with tape and heat the transfer foil with a hairdryer or a hot-air blower for example during a time of 10-30 seconds. The object, onto the target surface of which the transfer foil has been attached, can also be placed in an oven for a suitable time, if the object can withstand heating without being damaged. During the heating the fine structured surface of the transfer foil, which is in contact with the target surface, adheres to the surface of the target object. To ensure the contact the transfer foil can be lightly pressed against the surface of the target object. The pressing force needed for the pressing is so small that the pressing can be done by hand. When the transfer foil is pressed against the target surface, the foil may at the same time stretch a little, whereby it is better shaped according to the shapes of the target surface. The method thus makes possible the creating of a fine structure also on target surfaces that are curved in two or more directions. Thus the creating of a fine structure is possible for example on somewhat convex surfaces.

When the transfer foil is removed, a copied fine structure 104 is left from the transfer foil on the target surface, the pattern of which is substantially the same as the mirror image of the original fine structure of the transfer foil. This copied fine structure of the target surface functions in interaction with the light to achieve a diffractive optical effect.

In the method according to the invention a part of the original fine structure 102 of the transfer foil adheres to the target surface, whereby a mirror image of the original fine structure is copied onto the target surface. The amount of material adhering to the target surface is however very small compared to the dimensions of the original fine structure of the transfer foil. Typically the original fine structure of the transfer foil is made up of grooves, the depth of which is 100-200 nanometres when measured from the level of the surface of the transfer foil. Surprisingly it has been discovered that when using a transfer foil manufactured from cellulose acetate, the depth of the grooves in the copied fine structure formed on the surface of the target object is only slightly smaller than in the original fine structure. This has been shown in tests, wherein a transfer foil, the height of the original fine structure of which is 150 nm, has been manufactured from cellulose acetate. From the original fine structure of the transfer foil has with the method according to the invention been created a first copied fine structure, the height of which is about 120 nm, and a second copied fine structure, the height of which is also about 120 nm, on the target surface. It is believed that the interaction of the cellulose acetate of the transfer foil with the material of the target surface makes it soften, whereby the material of the target surface makes up a part of the copied fine structure.

Even after the first transfer the original fine structure is thus still left on the transfer foil, though its groove depth is smaller than before the transfer. The invention thus makes possible the repetition of the transfer according to the method with the transfer foil, which has already been used once or several times. It has been discovered through testing that a transfer foil manufactured for example from cellulose acetate can be used at least twice, before the quality of the created copied fine structure is significantly reduced.

A limitation with the use of cellulose acetate is that the transfer foil must be heated to a comparatively high temperature. The transfer temperature can be lowered by manufacturing the transfer foil from a material, which has a sufficiently good adhesion but a lower glass transition temperature. Such thermoplastic materials are among others ethyl vinyl acetate and polyvinyl butyral. When the transfer foil is manufactured from these materials, the transfer temperature, i.e. the temperature, whereto the transfer foil must be heated in order for the original fine structure to adhere to the target surface, can be about 80° C. In the method according to the invention any suitable transfer foil material can be used, preferably a thermoplastic material, the material characteristics of which enable the copying of an original fine structure, which creates a diffractive optical effect, from the surface of the transfer foil to the target surface with the method described above.

The method and transfer foil according to the invention are especially suited for creating copied fine structures, which produce a decorative optical effect, onto target surfaces. The use possibilities of the invention are not, however, limited only to decorative applications, but the invention can be used on several other objects, where diffractive gratings are needed. One such fine structure manufactured with the method is a coupling grating for a light beam, such as a laser.

Some advantageous embodiments of the method and the transfer foil of a diffractive optical element according to the invention are described above. The invention is not limited to the solutions described above, but the inventive idea can be applied in numerous ways within the scope of the claims.

The invention claimed is:

1. A method for creating a copied fine structure (104), which produces a diffractive optical effect, on a target surface (120), characterized in that in the method a transfer foil (100) is used, directly on the surface of which there is an original fine structure (102), which produces a diffractive optical effect, the transfer foil is placed on the target surface so that said original fine structure is in contact with the target surface, the transfer foil is heated to a temperature approaching the glass transition temperature of the material of the transfer foil, but lower than its melting temperature, causing the material of the transfer foil to adhere to the target surface, and the transfer foil is removed from the target surface creating a copied fine structure made of transfer foil material on the target surface.

2. The method according to claim 1, characterized in that the transfer foil is pressed against the target surface during the heating or thereafter.

3. The method according to claim 1, characterized in that said original fine structure (102) is created in the surface of the transfer foil (100) by hot embossing.

4. The method according to claim 1, characterized in that in the method a transfer foil (100) is used, the material of which is thermoplastic plastic.

5. The method according to claim 4, characterized in that the material of the transfer foil (100) is cellulose acetate.

6. The method according to claim 5, characterized in that the material of the transfer foil (100) is cellulose diacetate or cellulose triacetate.

7. The method according to claim 4, characterized in that the transfer foil (100) is heated to a temperature of 100-130° C.

8. The method according to claim 2, characterized in that the transfer foil (100) is pressed against the target surface (120) by hand.

9. The method according to claim 1, characterized in that a substance that improves adhesion is dispensed before the transfer foil (100) is placed on the target surface (120).

10. The method according to claim 1, characterized in that a copied fine structure (104) is created in the target surface (120), the height of which copied fine structure in the direction of the normal of the target surface is 100-200 nm, preferably 120-150 nm.

11. The method according to claim 1, characterized in that a copied fine structure (104), which produces a decorative optical effect, is created on the target surface (120).

12. The method according to claim 1, characterized in that a copied fine structure (104), which functions as a coupling grating for a light beam, is created on the target surface (120).

13. The method according to claim 2, characterized in that said original fine structure (102) is created in the surface of the transfer foil (100) by hot embossing.

14. The method of claim 1, wherein, in said step of using a transfer foil (100) having an original fine structure (102) located directly on a surface thereof, the fine structure on the transfer foil is defined by grooves in turn defining a diffractive grating pattern within the surface of the transfer foil.

15. The method of claim 14, wherein, widths and depths of the grooves are in a range of 100-1000 nanometers, and distances between adjacent patterns defining grating periods are in a range of 400-3000 nanometers.

16. The method of claim 14, wherein, the material of the transfer foil (100) is cellulose acetate, and depths of the grooves are in a range of 100-200 nanometers.

17. A method for creating a copied fine structure (104) producing a diffractive optical effect on a target surface (120), comprising the steps of:

using a transfer foil (100) having an original fine structure (102) located directly on a surface thereof, the original fine structure (102) producing a diffractive optical effect;

adhering the transfer foil on a target surface so that said original fine structure is in contact with the target surface;

causing the material of the transfer foil corresponding to the fine structure in contact with the target surface to adhere to the target surface by heating the transfer foil to a temperature less than a glass transition temperature of the material of the transfer foil and lower than the material's melting temperature; and creating a copied fine structure by removing the transfer foil from the target surface so that the material of the transfer foil corresponding to the fine structure is copied to and remains on the target surface as a copy of the fine structure on the target surface.

18. The method of claim 17, wherein, in said step of using a transfer foil (100) having an original fine structure (102) located directly on a surface thereof, the fine structure on the transfer foil is defined by grooves in turn defining a diffractive grating pattern within the surface of the transfer foil.

19. The method of claim 18, wherein, widths and depths of the grooves are in a range of 100-1000 nanometers, and distances between adjacent patterns defining grating periods are in a range of 400-3000 nanometers.

20. The method of claim 18, wherein, the material of the transfer foil (100) is cellulose acetate, and depths of grooves are in a range of 100-200 nanometers.

* * * * *